United States Patent
Camera

Patent Number: 5,279,066
Date of Patent: Jan. 18, 1994

[54] ELASTIC FISHING LINE

[76] Inventor: Philip A. Camera, P.O. Box 4031, Woodland Park, Colo. 80866

[21] Appl. No.: 920,620

[22] Filed: Jul. 24, 1992

[51] Int. Cl.$^5$ ............................................. A01K 91/00
[52] U.S. Cl. ..................................... 43/43.1; 43/44.9; 43/42.72
[58] Field of Search .................... 43/43.1, 44.9, 44.95, 43/44.92, 44.88, 43.15, 42.72

[56] References Cited

U.S. PATENT DOCUMENTS

| | | | |
|---|---|---|---|
| 155,266 | 9/1874 | Sprague | 43/42.72 |
| 2,223,823 | 12/1940 | Hampton | 43/42.72 |
| 3,096,599 | 7/1963 | Baron | 43/44.9 |
| 3,608,229 | 9/1971 | Ross | 43/44.9 |
| 3,693,275 | 9/1972 | Craig | 43/42.72 |
| 4,121,369 | 10/1978 | Lopez | 43/42.79 |
| 4,449,318 | 5/1984 | Lane | 43/44.9 |
| 4,817,326 | 4/1989 | Benjestorf | 43/43.1 |

Primary Examiner—Richard K. Seidel
Assistant Examiner—Chuck Y. Mah
Attorney, Agent, or Firm—Richard W. Hanes

[57] ABSTRACT

Apparatus for serial insertion in a fishing line comprising a line segment of substantial elasticity and having connecting eyes at each of its ends for attaching the respective ends of the segment to one end of a fishing line and a fishing leader. The line segment is trained through a transverse opening in a buoyant mass, such as a casting bubble and a pair of stop beads are carried by the segment between the ends of the buoyant mass and the respective connecting eyes in order to provide limited and highly responsive elasticity in the fishing line as built in assistance in setting the fishing hook upon a strike.

4 Claims, 1 Drawing Sheet

_ELASTIC FISHING LINE_

The present invention relates to fishing tackle, and more specifically to apparatus for enhancing the castability and hooking effectiveness of a line having a serial elastic insert.

BACKGROUND OF THE INVENTION

Plastic type bubbles which can be attached near the end of a fishing line have been used to raise the mass of the end of the fishing line to increase the casting distance. Bubbles have also been employed as markers and strike indicators.

Elasticity of at least a portion of a fishing line has also been recognized as having certain advantages in setting a hook after a strike, making precise and quick timing of the fisherman's response to that strike less critical.

It is the object of the present invention to combine the features of a traditional casting bubble with an elastic line segment to increase the efficacy of both tackle elements, that is using the one to augment the effect of the other.

DETAILED DESCRIPTION OF THE DRAWINGS

DETAILED DESCRIPTION OF THE INVENTION

Figure 1:
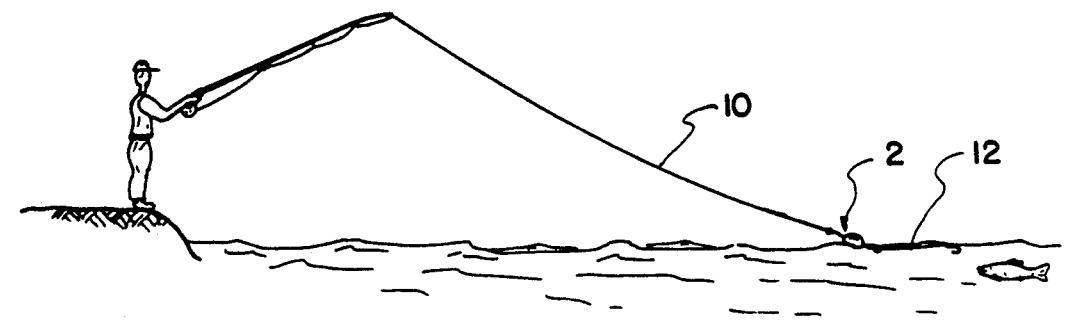
FIG. 1 is an illustration of a fishing pole and tackle set up showing the general location of the apparatus of the present invention relative to the line and hook.
Figure 2:
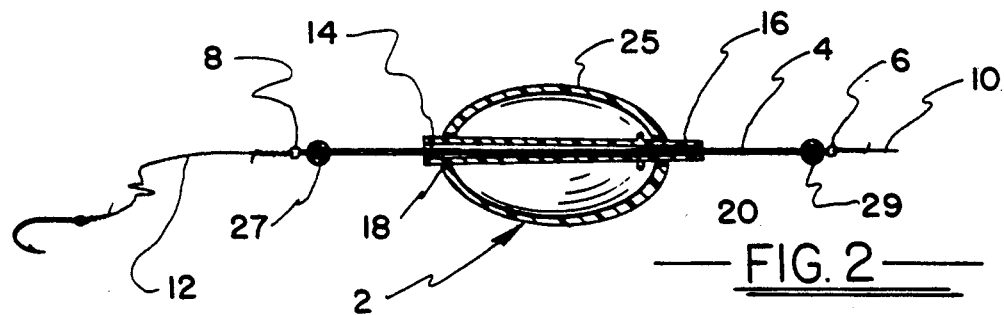
FIG. 2 is an enlarged cross sectional view of the bubble and the elastic segment of the fishing line and leader, which comprises the apparatus of the present invention. The elastic segment is shown in its relaxed state.
Figure 3:
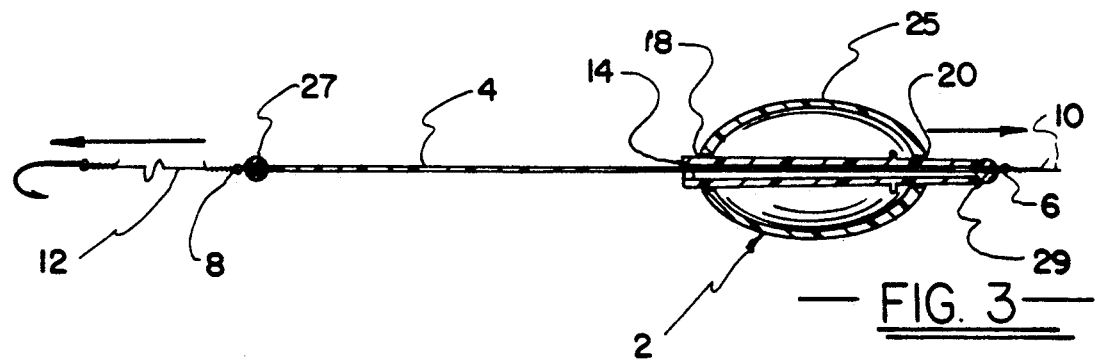
FIG. 3 is similar to FIG. 2 except that the elastic segment is shown in a stretched condition as a result of the opposing force arrows shown over the hook and over the proximal stop bead.

Referring to FIGS. 1 and 2 of the drawings, the apparatus of the present invention is shown generally by reference numeral 2. It may comprise a permanent butt section of a floating or sinking line. A four to six-inch length of urethane tubing 4, or some similar substantially elastic material is provided at each of its ends with eyes 6 and 8 with which to make connection to a fishing line 10 on the one end and a leader 12 on the other. By substantially elastic it is meant that the elasticity of the serial segment is at least three times the elasticity of the fishing line or leader, but preferably more than that.

The tubing 4 is trained through the tubular interior 14 of a tapered pin 16 which is contained within a casting bubble 25 and tightly fitted into aligned apertures 18 and 20 in the walls of the bubble. In a familiar manner, the tubular pin 16 may be withdrawn from its fitted position in the apertures 18 and 20 to open the apertures in order to allow water to be admitted to the interior of the bubble to increase the weight of the bubble.

Carried by the elastic tubing 4 and disposed on either side of the bubble 25 are two plastic beads 27 and 29, each having a diameter greater than that of the tubular interior 14 of the pin 16. The beads 27 and 29 serve a dual purpose. First, they act as keepers to maintain the bubble in a relatively fixed position on the fishing line. Second, the bead 29 next to the fishing line serves to stop the movement of the bubble relative to the line and the tubing when a fish strikes and pulls suddenly on the line. It is this feature which provides the synergy between the bubble and the elastic tubing. Without the bubble, a fish strike exerts sudden force on the line, pulling the line toward the fish. If the elastic tubing were inserted in the line without the bubble, the sudden pull on the line would tend to elongate the elastic section but only to a small degree. The force required to stretch the tubing must work against a force tending to restrain it and that small restraining force comes only from the friction between the line and the water.

With the bubble in place on the tubing, as shown in FIG. 2 of the drawings, at the instant of a strike the bead 29 quickly abuts the end of the bubble and further pulling force on the line must move the bubble through the water. The resistance of the bubble to movement through the water creates a substantial restraining force, allowing the pulling force of the strike to elongate the elastic tubing to a greater extent than it would be elongated without the bubble. Accordingly, the recoil of the stretched elastic is more dramatic and forceful, resulting in the hook being set without the critical timing of reaction by the fisherman which is normally required, especially in fly fishing. Similarly, during the playing of the fish and bringing it to the net, the combination of elasticity in the line and the restraint provided by the bubble to increase the elasticity lessens the chance that the line or leader may be broken or that the fish will be able to disgorge the hook during a period when a line not equipped with this apparatus might go slack.

I claim:

1. Apparatus for serial insertion in a fishing line comprising;
    a line segment of substantial elasticity having connecting means at each of its ends, said line segment being movable from a rest position to a stretched position,
    a buoyant mass having a transverse opening through which the said elastic segment is trained, and
    first and second stop means carried by the said elastic segment and disposed on either side of the opening in the buoyant mass and capable of being spaced from the buoyant mass when said line segment is in said rest position whereby the line tension caused by a biting fish will cause said mass to slide towards and abut one of said stop means, thereby providing a resistance increasing the elongation and subsequent rebound of the line segment to set a hook into said fish.

2. The apparatus combination of claim 1 where the buoyant mass is a hollow bulb having walls and an interiorly disposed transverse tubular rod and having opposing apertures in the walls for receiving the tubular rod and where the elastic segment is trained through the interior of the rod.

3. The apparatus of claim 2 where the rod is tapered and makes a water tight seal with the apertures.

4. The apparatus of claim 3 where the stop means are slidable on the elastic segment between one end of the mass and the connecting means most proximate to the said end of the mass.

* * * * *